United States Patent
Eldery et al.

(10) Patent No.: US 7,719,239 B2
(45) Date of Patent: May 18, 2010

(54) FAST FIELD DISCHARGE FOR GENERATOR OVER-VOLTAGE CONTROL

(75) Inventors: Mohamed A. Eldery, Mississauga (CA); Robert D. Paton, Caledon (CA)

(73) Assignee: Honeywell International Inc., Morristown, NJ (US)

( * ) Notice: Subject to any disclaimer, the term of this patent is extended or adjusted under 35 U.S.C. 154(b) by 481 days.

(21) Appl. No.: 11/692,076

(22) Filed: Mar. 27, 2007

(65) Prior Publication Data

US 2008/0238373 A1 Oct. 2, 2008

(51) Int. Cl.
 H02P 11/00 (2006.01)
 H02P 9/00 (2006.01)
(52) U.S. Cl. ....................................................... 322/28
(58) Field of Classification Search .................... 322/24, 322/28, 44, 17; 363/97, 155, 156
See application file for complete search history.

(56) References Cited

U.S. PATENT DOCUMENTS

| | | | |
|---|---|---|---|
| 3,354,375 A * | 11/1967 | Poppinger et al. ............ | 363/129 |
| 3,581,150 A * | 5/1971 | Kirk et al. ..................... | 361/18 |
| 4,118,749 A | 10/1978 | Matuzaki et al. | |
| 4,277,738 A | 7/1981 | Voss | |
| 4,459,631 A | 7/1984 | McNamee | |
| 4,737,706 A | 4/1988 | Eilersen | |
| 5,939,844 A * | 8/1999 | Shiomi et al. ................ | 315/408 |
| 6,031,701 A | 2/2000 | Maeckel et al. | |
| 6,583,995 B2 | 6/2003 | Kalman et al. | |
| 6,606,860 B2 * | 8/2003 | McFarland .................... | 60/648 |
| 6,693,414 B2 * | 2/2004 | Ando .......................... | 323/303 |
| 6,737,833 B2 | 5/2004 | Kalman et al. | |
| 6,838,860 B2 | 1/2005 | Huggett et al. | |
| 6,876,177 B2 | 4/2005 | Namuduri et al. | |
| 6,909,262 B2 | 6/2005 | Yao et al. | |
| 7,064,524 B2 * | 6/2006 | Yao ............................. | 322/25 |
| 7,180,271 B2 * | 2/2007 | Takahashi et al. ............. | 322/28 |
| 2005/0237687 A1* | 10/2005 | Takahashi et al. ............. | 361/92 |
| 2008/0259509 A1* | 10/2008 | Eldery et al. .................. | 361/21 |

* cited by examiner

*Primary Examiner*—Julio C. Gonzalez
(74) *Attorney, Agent, or Firm*—Oral Caglar, Esq.

(57) ABSTRACT

A voltage regulator for controlling over-voltage conditions in an electrical generator by rapidly discharging the generator field winding current into a discharge resistor upon the detection of the over-voltage. A field discharge transistor is switched by a soft switching circuit to direct the generator field winding current to the discharge resistor. A hysteresis circuit detects when a point of regulation voltage exceeds a first threshold triggering the discharge of the generator field winding current. The hysteresis circuit also detects when the point of regulation voltage goes below a second lower threshold and triggers the field discharge transistor to bypass the discharge resistor and return to a normal mode.

9 Claims, 5 Drawing Sheets

FAST FIELD DISCHARGE FOR GENERATOR OVER-VOLTAGE CONTROL

BACKGROUND OF THE INVENTION

The present invention generally relates to apparatus and methods for voltage regulation in electric power generators and, more specifically, to apparatus and methods of preventing over-voltage in electric power generators during load removal.

Electric power generators are used to provide onboard power to electrical devices in many applications. Two examples of electric power generators are constant speed, constant frequency generators, as shown in FIG. 1-A and variable speed, constant frequency generators, as shown in FIG. 1-B. In such electric power generators it is important to maintain the supplied voltage level within an acceptable range. To accomplish this, as shown in FIGS. 1-A and 1-B, a voltage regulator 10 senses the voltage at a Point of Regulation and sends a signal to a field discharge circuit 102, which controls the current in the field winding 100. By changing the current in the field winding 100, the generator (G in FIGS. 1-A and 1-B) output is controlled as well as the voltage at the Point Of Regulation (POR) 103. In certain situations, such as during the sudden removal of a large load or post certain fault conditions, the generator terminal voltage may reach a high value, which can damage electrical devices connected to the generator. A voltage regulator can be used to reduce the field current in the generator to reduce the terminal voltage. To accomplish this, since the field power is unidirectional, the field current must be dissipated in the field resistance. However, the field resistance is small so the recovery time to return to the desired regulated voltage will be large. This can result in an over-voltage condition on the generator terminal for an unacceptably long period of time resulting in damage to electrical devices receiving power from the generator.

FIG. 2 depicts a block diagram of a conventional generator voltage regulator, such as the voltage regulator 10 shown in FIGS. 1-A and 1-B. The generator voltage regulator 10 includes a constant DC voltage source, shown as $+V_{DC}$ and $-V_{DC}$. A voltage regulator controller (VRC) 12 receives a signal $V_{POR}$ from a Point of Regulation, typically an AC generator terminal (not shown). The output of the voltage regulator controller 12 is connected to a pulse width modulation (PWM) controller 14, which in turn has its output connected to the gate of a transistor 16, which may be a conventional MOSFET power transistor. The drain of the transistor 16 is connected to $-V_{DC}$ and its source is connected to a generator field winding 18 at its first end 20. A second end 24 of the generator field winding 18 is connected to $+V_{DC}$. A free-wheeling diode 22 has its anode connected to the first end 20 of the generator field winding 18 and its cathode connected to $+V_{DC}$.

In response to the voltage level of $V_{POR}$, the voltage regulator controller 12 provides a signal to the PWM controller 14, which triggers the PWM transistor 16. PWM transistor 16 is used to chop the DC voltage ($V_{DC}$), thereby controlling the field voltage and consequently the field current $I_{FIELD}$ through the generator field winding 18. For example, during a load removal condition, the voltage regulator controller 12 causes the PWM controller 14 to reduce the field current. During this process, the field current keeps circulating through the free-wheeling diode 22. Unfortunately, this field current may not reduce quickly the energy to control the over-voltage condition and avoid damage to electrical devices attached to the generator.

As can be seen, there is a need for a voltage regulator circuit for electrical power generators which can rapidly respond to load removal and other fault situations to rapidly prevent over-voltage conditions at the generator terminal.

SUMMARY OF THE INVENTION

In one aspect of the invention, a generator control circuit comprises a field discharge transistor having a source connected to a first terminal of a generator field winding which carries a field current. A free-wheeling diode has a cathode which is connected to a drain of said field discharge transistor and an anode which is connected to a second terminal of said generator field winding. A resistor is connected between said first generator field winding terminal and said field discharge transistor drain. When the field discharge transistor is in an on state the generator field current bypasses the resistor. When the field discharge transistor is in an off state the generator field current passes through and is dissipated by the resistor.

In another aspect of the invention, a field discharge circuit prevents an over-voltage condition in an electrical power system, which includes a detector circuit for sensing a voltage in the electrical power system and detecting if the sensed voltage exceeds a threshold. The field discharge circuit also includes a generator field circuit, a discharge resistor and a field discharge circuit for discharging excess energy to said discharge resistor in response to the detection of an overload condition by said detector circuit.

In a further aspect of the invention, a method for preventing an over-voltage condition in a generator having a field winding is provided. The method comprises the steps of: sensing a point of regulation voltage at an output of said generator; determining if said point of regulation voltage is above an upper threshold when a field discharge transistor connected to said field winding is in an on state; if said point of regulation voltage is above said upper threshold, turning said field discharge transistor off and if said point of regulation voltage is not above said upper threshold repeating the step of sensing said point of regulation voltage when said discharge transistor is in an on state; discharging field current through a resistor when said field discharge transistor is in an off state; sensing said point of regulation voltage when said discharge transistor is in an off state; determining if said point of regulation voltage is below a lower threshold when said field discharge transistor is in an off state; and if said point of regulation voltage is below said lower threshold, turning said field transistor on and if said point of regulation voltage is not below said lower threshold repeating said step of sensing said point of regulation voltage field current when said discharge transistor is in an off state.

These and other features, aspects and advantages of the present invention will become better understood with reference to the following drawings, description and claims.

BRIEF DESCRIPTION OF THE DRAWINGS

FIG. 1-B is a block diagram of a variable speed, constant frequency electric generation system in accordance with the prior art showing the location of the voltage regulator with respect to the field and generator;

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a field discharge circuit for a voltage regulator that achieves fast and efficient control of the output voltage of an electrical power generator. The present invention may be utilized, for example, in the onboard electrical power system of an aircraft, or may be used in many other kinds of applications requiring electrical power.

The field discharge circuit of the invention may prevent over-voltage from occurring during large load removal conditions. The present invention may accomplish this by using a discharge resistor to dissipate excess field energy during load removal without causing any electromagnetic interference with other onboard systems due to soft switching used in this invention. Upon sensing of an over-voltage condition, a field discharge transistor may be used to direct the field current to the discharge resistor. A soft switching circuit is used to switch the field discharge transistor so as to avoid undesirable voltage spikes and electromagnetic interference (EMI). By using a relatively large resistance value for the discharge resistor, the field current may be reduced very quickly resulting in a fast reduction in voltage at the generator terminal. For example, in one exemplary embodiment the voltage may be reduced to an acceptable level within 1.5 ms. Prior art generator voltage regulators generally relied on control of a PWM circuit to regulate the field current, without use of a field discharge resistor. Because of the small resistance and high inductance of the field winding in such prior systems, the field current could not be reduced rapidly and an over-voltage could appear on the generator terminal for a relatively long period of time resulting in damaged electrical devices.

Figure 1A:
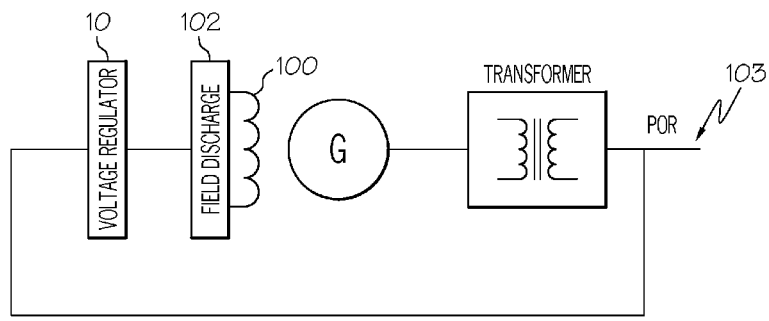
FIG. 1-A is a block diagram of a constant speed, constant frequency electric generation system in accordance with the prior art showing the location of the voltage regulator with respect to the field and generator.
Figure 1B:
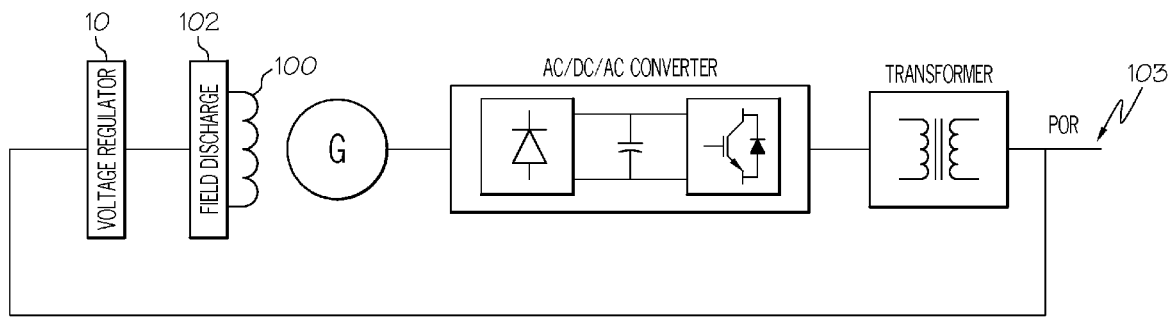
Figure 2:
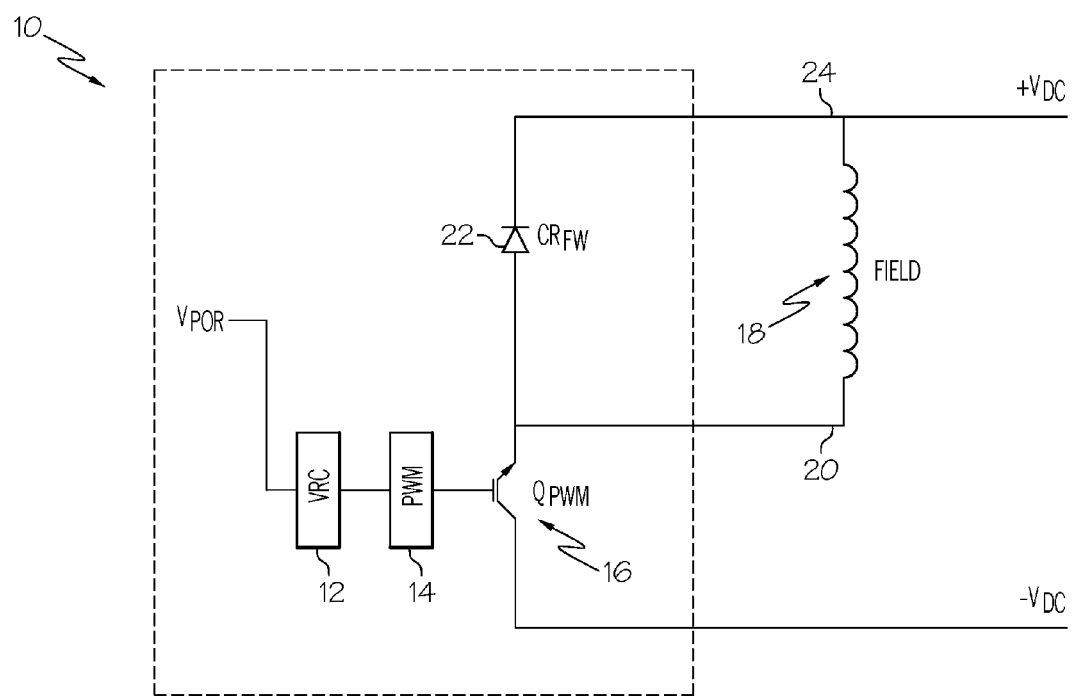
FIG. 2 is a circuit diagram of a voltage regulator for a generator in accordance with the prior art.
Figure 3:
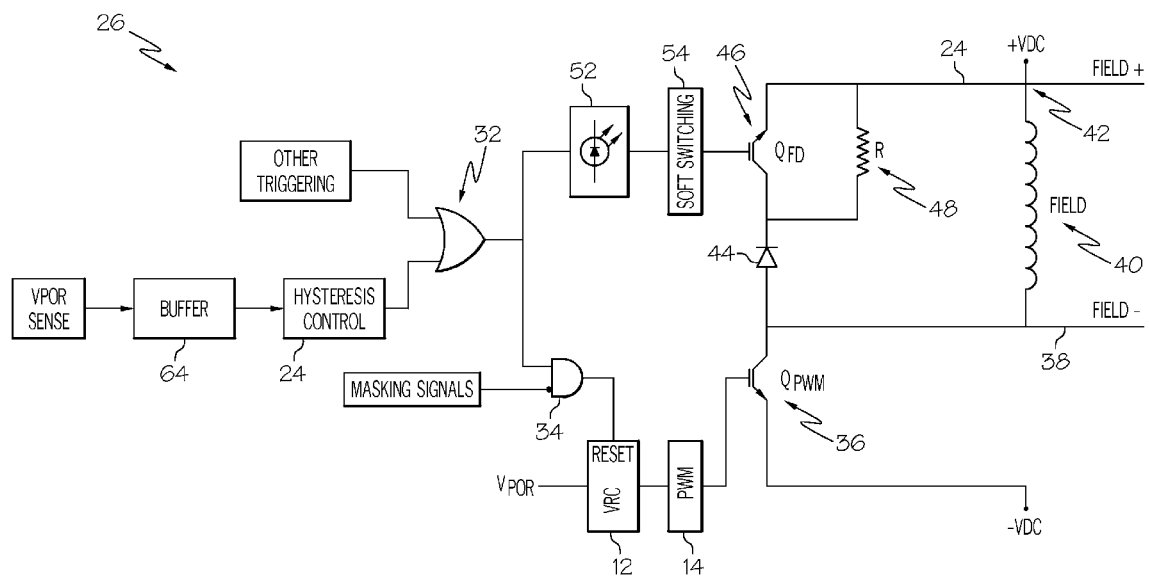
FIG. 3 is a circuit diagram of a voltage regulator for a generator with a field discharge circuit in according to an embodiment of the invention.

Referring now to FIG. 3, a voltage regulator 26 according to an exemplary embodiment of the invention is shown. The voltage regulator 26 may include a constant DC voltage source, shown as $+V_{DC}$ and $-V_{DC}$. The voltage regulator 26 may receive a signal $V_{POR}$ from a Point of Regulation, typically the generator AC terminal. The $V_{POR}$ signal may be received by a voltage hysteresis control circuit 28 which may process the $V_{POR}$ signal as described in more detail below. The output of the voltage hysteresis control circuit 28 may be connected to the RESET of the voltage regulator controller 12 through an OR gate 32, and an AND gate 34. The PWM circuit 14 is driven by voltage regulator controller 12 and its output may be connected to the gate of a PWM transistor 36, which may be a conventional MOSFET power transistor. The source of the PWM transistor 36 may be connected to $-V_{DC}$ and the drain may be connected to a negative end 38 of a generator field winding 40. A positive end 42 of the generator field winding 40 may be connected to $+V_{DC}$. A free-wheeling diode 44 may have its anode connected to the negative end 38 of the generator field winding 40 and may have its cathode connected to the drain of a field discharge transistor 46, which may be a conventional MOSFET power transistor. The source of the field discharge transistor 46 may be connected to $+V_{DC}$. A field discharge resistor 48 may be connected across the drain and the source of the field discharge transistor 46.

Other triggering signals may be connected to an input of the OR gate 32. The OR gate output is connected to both the AND gate 34 and to a conventional optical isolation unit 52, which provides the necessary electrical isolation from the generator field winding 40. The output of the optical isolation unit 52 may be directed to a soft switching circuit 54 which may control the gate of the field discharge transistor, as described in detail below.

In general, the manner in which the voltage regulator 26 may respond to a generator over-voltage condition is by sensing the voltage level of $V_{POR}$ and controlling the switching signal to the field discharge transistor 46 based on the sensed voltage. For example, when $V_{POR}$ is smaller than an upper threshold value the field discharge transistor 46 may be turned on allowing the field current to circulate through the field discharge transistor 46. This is the normal mode of operation. When an over-voltage condition occurs, caused for example by a large load removal, and $V_{POR}$ exceeds an upper threshold value, the field discharge transistor may be turned off, allowing excess field energy to be transferred to the field discharge resistor 48. The speed of this excess energy transfer may depend on the value of the field discharge resistor 48 and the turn off characteristic shape of the transistor control. In one embodiment of the invention a resistance value of 120 ohms may be used, which may resulted in a discharge time of 1.5 ms.

It should be noted that there are certain conditions where it may be desirable to allow a high field current, such as feeder faults. To handle such situations, the voltage regulator 26 may include an input labeled "masking signals" to the AND gate 34, which may mask the action of the field discharge transistor 46 by controlling the PWM transistor 36. Furthermore, there are other situations, besides an over-voltage on $V_{POR}$ in which it might be desirable to transfer excess field energy to the field discharge resistor 48. These situations may include transformer faults. Accordingly, a signal labeled "other triggering" may be added to the OR gate input, which will trigger the field discharge transistor 46 in such situations.

Figure 5:
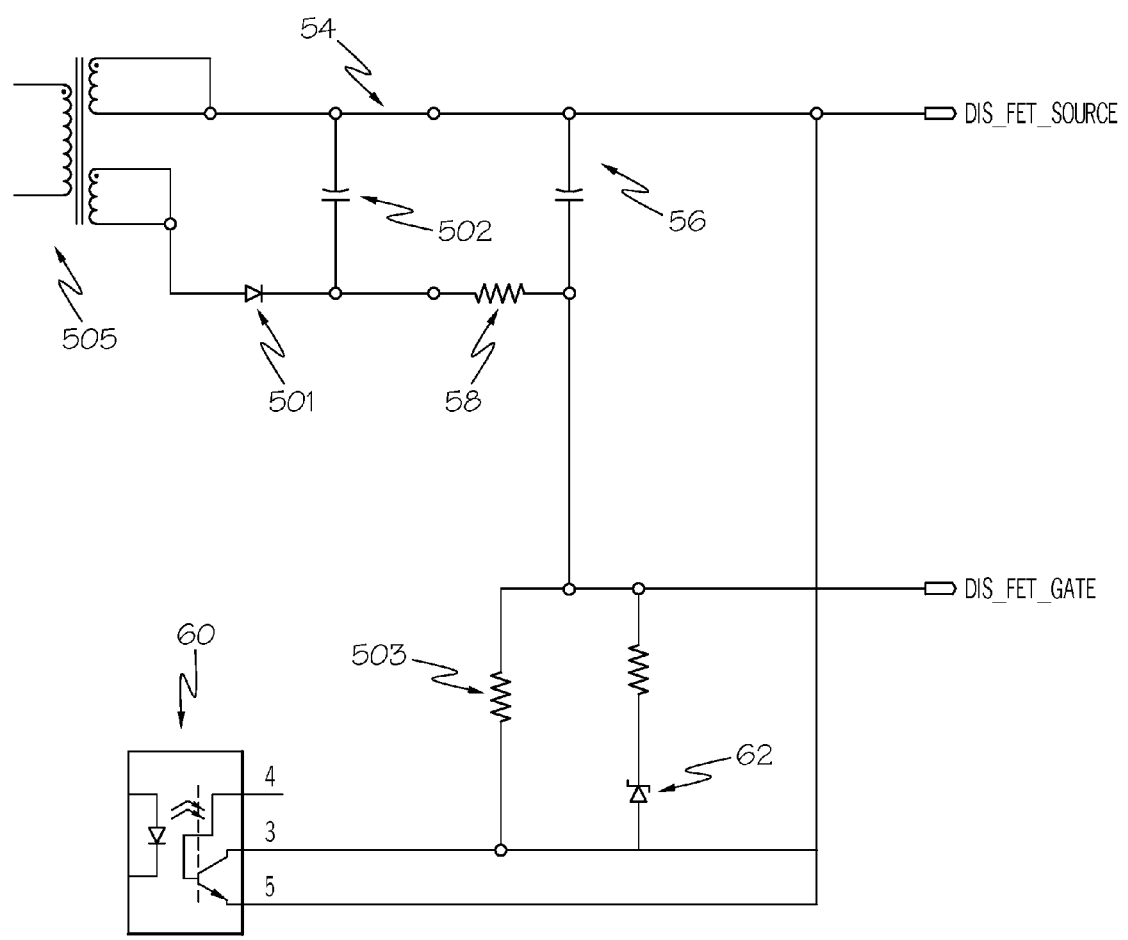
FIG. 5 is a circuit diagram of the soft switching circuit used in the voltage regulator shown in FIG. 3 according to an embodiment of the invention.

When the field discharge transistor 46 is switched there is the possibility of induced high voltages and EMI problems. To avoid these problems, a soft switching circuit 54 may be used as shown in FIGS. 3 and 5. The soft switching circuit 54 may switch the field discharge transistor 46 through its linear region so that the rate of change of current transfer from the transistor to the discharge resistor is very small. Soft switching circuit 54 may include a capacitor 56, a resistor 502, an opto-coupler 60 and a Zener diode 62. Essentially, the soft switching circuit 54 is a power supply which controls the gate of the field discharge transistor 46. The value of the resistor 503 and capacitor 56 may be selected to control the discharge time, that is, the rate of change of the current through the field discharge transistor 46 gate. Thus the switching time of the gate of the field discharge transistor 46 may be slowed down sufficiently to reduce any EMI problems and control the voltage level of the field.

FIG. 3 shows that hysteresis control 28 may control the switching of the field discharge transistor 46 depending on the state of $V_{POR}$. The $V_{POR}$ signal may be buffered by a buffer 64, which may be a high impedance op-amp. Hysteresis control unit 28 may comprise two comparators, one for an upper threshold and one for a lower threshold. In one embodiment, for example, the upper threshold may be 125V AC and the lower threshold may be 115 VAC.

In normal operation, the field discharge resistor 48 may be shorted by the field discharge transistor 46 and the field current circulates through the free-wheeling diode 44. When a $V_{POR}$ signal is received that exceeds the upper threshold, the voltage hysteresis control circuit 28 may send a signal that causes the field current to discharge through field discharge resistor 48, by opening the field discharge transistor 46. At the same time the VRC 12 and consequently PWM circuit 14 may be shut down and the soft switching circuit 54 may be reset. As a result, the field current will be zero, which reduces the voltage at the generator and at the Point of Regulation, so protection against over-voltage is achieved. As the voltage continues to fall, once $V_{POR}$ falls below the lower threshold, the field discharge transistor 46 may be turned on again through the soft switching circuit 54.

Figure 4:
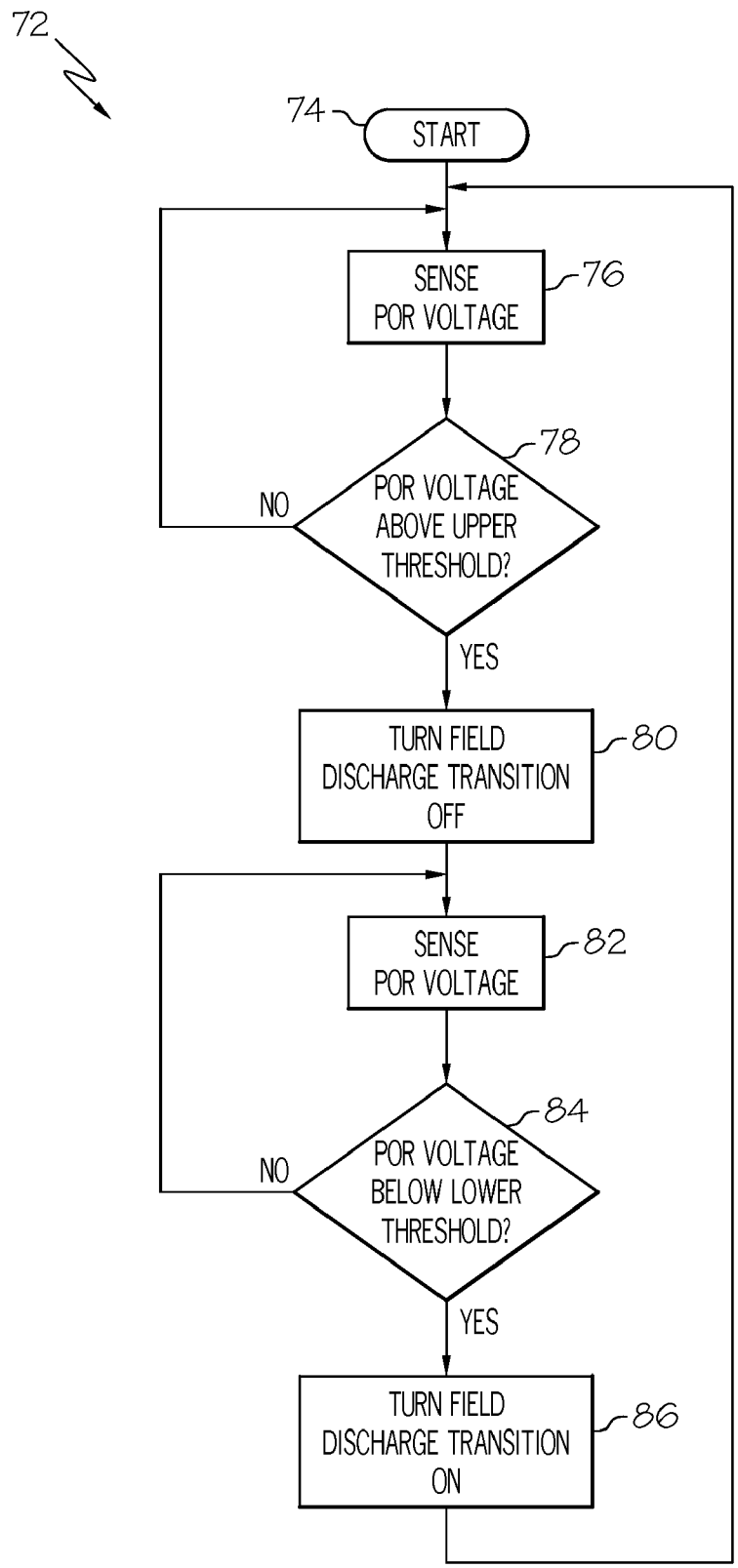
FIG. 4 is a flow chart illustrating one process for preventing an over-voltage condition according to an embodiment of the invention.

FIG. 4 shows a flow chart illustrating one process 72 for preventing an over-voltage condition in a generator in accordance with an embodiment of the invention. Process 72 starts at step 74 where it is assumed that the generator is in a normal mode. This means that, for example, field discharge transistor 46 in the voltage regulator 26 of FIG. 3 may be on. This may allow the generator field current to bypass field discharge resistor 48. At step 76 the point of regulation voltage, $V_{POR}$, may be sensed. Step 78 is a decision. If the point of regulation voltage sensed in step 76 is greater than an upper threshold, process 72 may continue with step 80. Otherwise the process 72 may return to step 76 in a loop and the point of regulation voltage may be sensed again. When the point of regulation voltage is found to exceed an upper threshold in step 78, the field discharge transistor 46 may be soft switched off. This means that an over-voltage condition exists. Soft switching field discharge transistor off will smoothly direct the field current through the field discharge resistor 48, which may cause the field current to decrease. The process 72 then continues with step 82 where the point of regulation voltage may be sensed again and the process proceeds to decision step 84. A determination may be made in step 84 of whether the point of regulation voltage has dropped below a lower threshold. If the point of regulation voltage is still above the lower threshold, the process 72 loops back to step 82 and the point of regulation voltage may be sensed again. Once the point of regulation voltage falls below the lower threshold, as determined in step 84, the process 72 will proceed to step 86, wherein the field discharge transistor may be turned back on. This may again allow the field current to flow through field discharge transistor 46, bypassing the field discharge resistor 48. Process 72 will then loop back to the beginning at step 76 and the process will repeat. It is noted that the voltage regulator controller 12 and the PWM circuit 14 are reset during the discharge process.

FIG. 5 shows the circuit 54 that may be used for soft switching of the discharge transistor 46. The circuit 54 may consist of an isolated power supply to supply the transistor 46 gate including transformer 505 along with rectifier 501 and filter comprising capacitor 502 and resistor 58. The soft switching function may be achieved by smoothly discharging capacitor 56 through 503. In this way the gate voltage is changing smoothly and the transistor 46 is switched in linear mode and hence there will be no high produced voltage. Zener 62 is used to shape the control voltage to the transistor and opto coupler 60 is used for isolation.

As can be seen by those skilled in the art, the present invention provides and improved apparatus and method of rapidly reducing the field current in a generator in response to over-voltage conditions. By directing the generator field current to a discharge transistor, the field current and the generator output voltage, are reduced fast enough to prevent damage to electrical devices powered by the generator.

It should be understood, of course, that the foregoing relates to exemplary embodiments of the invention and that modifications may be made without departing from the spirit and scope of the invention as set forth in the following claims.

We claim:

1. A generator control circuit comprising:
   a field discharge transistor having a source connected to a first terminal of a generator field winding which carries a generator field current;
   a free-wheeling diode having a cathode connected to a drain of said field discharge transistor and an anode connected to a second terminal of said generator field winding;
   a resistor connected between said first generator field winding terminal and said field discharge transistor drain, wherein when said field discharge transistor is in an on state, said generator field current bypasses said resistor; and when said field discharge transistor is in an off state, said generator field current passes through and is dissipated by said resistor;
   a pulse width modulator (PWM) transistor having a drain connected to said second generator field winding terminal; and
   a PWM controller connected to a gate of said PWM transistor.

2. The generator control circuit of claim 1 further comprising:
   a soft switching circuit connected to a gate of said field discharge transistor for controlling a switching time of said field discharge transistor; and
   a voltage hysteresis controller connected to said soft switching circuit for detecting if a point of regulation voltage exceeds a first predetermined voltage and producing a first voltage hysteresis controller output signal to said soft switching circuit causing said field discharge transistor to turn off, thereby allowing said generator field current to be transferred to said resistor.

3. The generator control circuit of claim 2 wherein said first voltage hysteresis controller output signal is also connected to said PWM controller causing said PWM controller to turn off said PWM transistor.

4. The generator control circuit of claim 3 wherein said voltage hysteresis controller also detects when said point of regulation voltage falls below a second predetermined voltage, which is lower than said first predetermined voltage, producing a second voltage hysteresis controller output signal to turn said field discharge transistor on and said PWM controller on.

5. The generator control circuit of claim 4 wherein said voltage hysteresis controller further comprises an input buffer.

6. The generator control circuit of claim 5 further comprising an OR gate having inputs connected to said voltage hysteresis controller and having an output connected to said soft switching circuit input.

7. The generator control circuit of claim 6 wherein said OR gate has an input connected to an additional triggering signal responsive to a fault condition.

8. The generator control circuit of claim 7 further comprising an AND gate having an input connected to said OR gate output and an input connected to a masking signal, wherein said AND gate output is connected to said PWM controller.

9. A generator control circuit comprising:

a field discharge transistor having a source connected to a first terminal of a generator field winding which carries a generator field current;

a free-wheeling diode having a cathode connected to a drain of said field discharge transistor and an anode connected to a second terminal of said generator field winding;

a resistor connected between said first generator field winding terminal and said field discharge transistor drain, wherein when said field discharge transistor is in an on state, said generator field current bypasses said resistor; and when said field discharge transistor is in an off state, said generator field current passes through and is dissipated by said resistor; and a soft switching circuit connected to a gate of said field discharge transistor for controlling a switching time of said field discharge transistor, the soft switching circuit comprising:

a capacitor and a Zener diode both coupled between said field discharge transistor source and said field discharge transistor gate;

an opto-coupler having a drain connected to said field discharge transistor gate; and a power supply and a filter connected between said field discharge transistor source and said field discharge transistor gate, wherein said soft switching circuit controls the speed in which said field discharge transistor gate switches.

* * * * *